United States Patent [19]

Baski

[11] 4,455,027

[45] Jun. 19, 1984

[54] PACKER APPARATUS

[76] Inventor: Henry A. Baski, 1586 S. Robb Way, Denver, Colo. 80226

[21] Appl. No.: 432,812

[22] Filed: Oct. 5, 1982

[51] Int. Cl.³ .............................................. F16J 15/46
[52] U.S. Cl. ................................. 277/34.6; 277/203; 277/230
[58] Field of Search ............... 277/9.5, 34, 34.3, 34.6, 277/205, 230

[56] References Cited

U.S. PATENT DOCUMENTS

2,611,437  9/1952  Lynes .................................. 277/34.6
2,872,230  2/1959  Desbrandes ........................ 277/34.6

*Primary Examiner*—Robert I. Smith
*Attorney, Agent, or Firm*—Klaas & Law

[57] ABSTRACT

An improved packer apparatus used for isolating portions of a drill hole or the like while providing an inner passageway for fluid communication and/or access between selected areas within the hole. An improved head design providing for an inner passageway of relatively greater diameter and facilitating the use of adapters for multiple packer applications is disclosed. Novel inflation means for inflating a packer gland are described. An improved reinforced packer gland is also described.

21 Claims, 19 Drawing Figures

PACKER APPARATUS

BACKGROUND OF THE INVENTION

The present invention relates generally to packers used for isolating portions of a drill hole or the like and more particularly, to inflatable packers of the type having an expandable gland which may be inflated by a fluid to cause the gland to engage the surface of the surrounding hole in sealing relationship.

An inflatable packer of the type presently known in the art consists generally of an elongate, rigid, inner tubular member having packer head members mounted at either end. Packer head members are generally annular in shape having diameters substantially exceeding that of the inner tubular member. Opposite ends of a tubular gland member are generally sealed to the outer annular surfaces of the head members thereby enclosing the inner tubular member within the gland member and forming an annular cavity between opposed surfaces of the inner tubular member and gland member. The internal tubular member provides structural integrity to the packer and may also accommodate the flow of fluids or interior pipe or wire placement or the like. The annular cavity between the gland member and the inner tubular member may be inflated with air to cause the packer element to expand and engage the surface of a hole, pipe casing, or other surrounding surface in which it is enclosed.

Inflatable packers have been used in a variety of applications to bring about a supportive or sealing contact between the packer gland and a portion of an elongate hole while simultaneously providing means for access to various zones along the length of the hole through the packer inner tubular member. For example, inflatable packers have been used to support sealed sections of casing pipe or drill pipe or a tubing string within a borehole. Packers have also been used to support an inner tubing string within an existing outer tubing string. Inflatable packers have been used to isolate zones within a borehole for testing, pumping and sampling purposes and as an integral part of pneumatic sampling and pumping systems. Packers have also been used to plug off a portion of a hole or pipe or alternately, to seal off a leaking portion of a sewer or waterpipe while simultaneously providing a fluid passage therethrough by means of two packers, one positioned on either side of the leak, and conduit supported between the packers. Packers have also been used in numerous other applications well known in the art. Prior to the present invention, each different use generally required a different type of packer.

With prior art packers, the packer heads have been considerably larger in diameter than the inner tubular member in order to provide sufficient strength to couple the packer to other connecting elements while simultaneously providing an attachment surface for the gland member. The problem with such an arrangement lies in the fact that the overall dimensions of the packer at the point of connection of the gland member to the packer heads is considerably larger than the diameter of the inner tubular member. Thus, there is a great size differential between the diameter of the passage provided through the packer by the inner tubular member and the diameter of the surrounding hole. This size reduction in the packer passage, of course, limits the amount of test conduit, etc. which can be inserted through the inner passage or in case of pumping operations, greatly limits the fluid flow rate through the hole because of the restriction produced by the packer.

In existing packers testing cables, air lines, etc., are often passed through conduit positioned in peripheral bores in the head members and extending between the heads through the annular cavity created by the gland and the inner tubular member. The placement is necessitated because of the lack of space within the inner tubular member. As a result, most such packers can only be used for a single purpose because of their fixed conduit configurations.

The inflatable gland of the packer has caused problems because of its tendency to rupture at high pressures or when encountering sharp or uneven surfaces of the type often associated with boreholes through rocky layers. The use of reinforcing material has met with only partial success in the past due to the fact that the reinforcing material, if sufficiently strong to prevent rupture of the gland has proven to be too unyielding to provide adequate inflation in many circumstances.

Thus, a need exists for a packer having an inner passageway of a greater diameter with respect to the packer outer diameter for providing improved fluid flow capacity or instrument placement within the packer. Such a packer should be adaptable to multiple uses and easily converted from one use configuration to another without major structural modifications. It is also desirable to provide a packer having a reinforced gland member which is capable of being inflated to high pressures and used against uneven or rough surfaces without rupture while simultaneously providing sufficient expansion to cause proper sealing engagement with a surrounding hole.

SUMMARY OF THE INVENTION

The present invention comprises an inflatable packer having an inner tubular member, two head members and an encompassing gland member. The head members are attached to either end of the inner tubular member and the gland member is attached at each end to a portion of each head member. Each packer head member comprises a body portion having an interior cavity therein and an elongate sleeve portion extending axially inwardly from the body portion. Each head member has an inner passageway therein coaxial and of substantially equal diameter to that of the passageway in the body portion. The outer diameter of the sleeve portion is substantially smaller than that of the outer diameter of the body portion and comprises the mounting surface for the gland member. The inner tubular member comprises exterior threads on at least one end thereof which are mateable with the interior threads provided in the inner passageway of the body portion of at least one of the packer heads. The gland member is mounted on the outer surface of the sleeve portion of each packer head by band means or the like providing a reduced packer diameter with respect to packers of conventional construction due to the reduced diameter of the sleeve portion with respect to the diameter of the body portion of each head. In one embodiment both packer heads are attached to opposite threaded ends of the inner tubular member in the manner above described. In another embodiment one of the packer heads is provided with O-rings at the surface of the inner passage of the body portion whereby sliding sealing contact between the packer head inner passage and the outer surface of the inner tubular member is provided. The latter embodiment may be used in association with a reinforced gland element to allow the gland to progressively shorten in length as it expands during inflation.

The gland member may be inflated by air or other fluid provided through a fluid passageway in at least one of the two packer heads. The passageway may comprise a bore through the body portion of the head which intersects one of the head inner passage at a point axially inward of the area of threaded attachment of the head and inner tubular means. The bore may be provided in a generally axially extending direction entering the body portion at the end surface thereof and being intersected by a second generally radially extending bore. In another embodiment, the bore may be directed generally axially with a slight radially inward inclination to provide intersection with the inner passage at the aforementioned point. The surface of the head inner passage and the outer surface of the inner tubular member define an annularly shaped second portion of the fluid passageway which is in fluid communication with the first portion defined by the above described bores. Fluid under pressure may be directed through the bores and annular passageway formed by the surfaces of the sleeve and inner tubular member to inflate an inflation chamber defined by the inner surface of the gland member and outer surface of the inner tubular member. This inflation chamber, during deflated conditions, comprises a very thin annular volume having a thickness substantially equal to that of the sleeve portion of the head. Thus, by providing a thin sleeve for gland attachment, the total diameter of the apparatus is reduced with respect to conventional apparatus. The sleeve also coacts with the bore in the body to allow inflation of the packer without separate conduit. Thus, the sleeve portion serves the dual function of gland inflation means and gland attachment means and achieves the result of minimizing the external diameter of the packer with respect to the tubular passageway provided in the inner tubular member. The relatively larger diameter of the passage through the inner tubular member achieved by the improved head design allows all instrument and air conduit, etc. to be passed through the inner tubular member rather than between the inner tubular member and the gland as in some conventional designs. As a result, screw-in head caps of various configuration may be inserted in one or both heads to change the packer internal passage configuration to provide for multiple applications.

The gland member in a reinforced embodiment thereof comprises an inner bladder layer formed from a resiliently expansible substance such as rubber or the like. A second layer is formed by a reinforced wrap wound at a predetermined angle with respect to the longitudinal axis of the gland member. A third layer is formed from reinforced wrap of identical material as used in the second layer and provided at an orientation opposite that to the second layer. It has been found that such a wrapping allows the wrap material to change in three-dimensional orientation with respect to the axis of the gland member as the gland expands in such a manner as to create an increased gland diameter in association with a decrease in gland length. Such an orientation is produced by a shifting in the position of the wrap without an extension or contraction along the longitudinal axis of the wrap itself. Thus, such a wrapping configuration may be provided using a high strength, non-stretching material such as the steel belting material used in automobile tires, aramid, or the like. A third, fourth and subsequent pairs of wraps may be provided as required to change the expansion characteristics of the gland member and to provide additional resistance to rupture.

Thus, it is an object of the invention to provide an inflatable packer having an improved head configuration which allows the internal diameter of the packer to be maximized with respect to the outer diameter of the packer.

It is another object of the invention to provide an improved packer which may be used as a fixed end packer or as a movable end packer.

It is another object of the invention to provide a packer having a reinforced bladder which is resistant to rupture and yet sufficiently extensible to produce a proper seal at the surface of a surrounding hole.

It is another object of the invention to provide a packer which may be used in multiple applications without modification to the basic packer design.

It is another object of the invention to provide a packer which may be produced at a relatively low cost.

It is another object of the invention to provide a packer which may be provided in multiple lengths and with glands having multiple pressure ratings.

It is another object of the invention to provide packers that may be ganged together to pack off a length of hole.

BRIEF DESCRIPTION OF DRAWING

An illustrative and presently preferred embodiment of the invention is shown in the accompanying drawing in which.

DETAILED DESCRIPTION OF THE INVENTION

Figure 1:
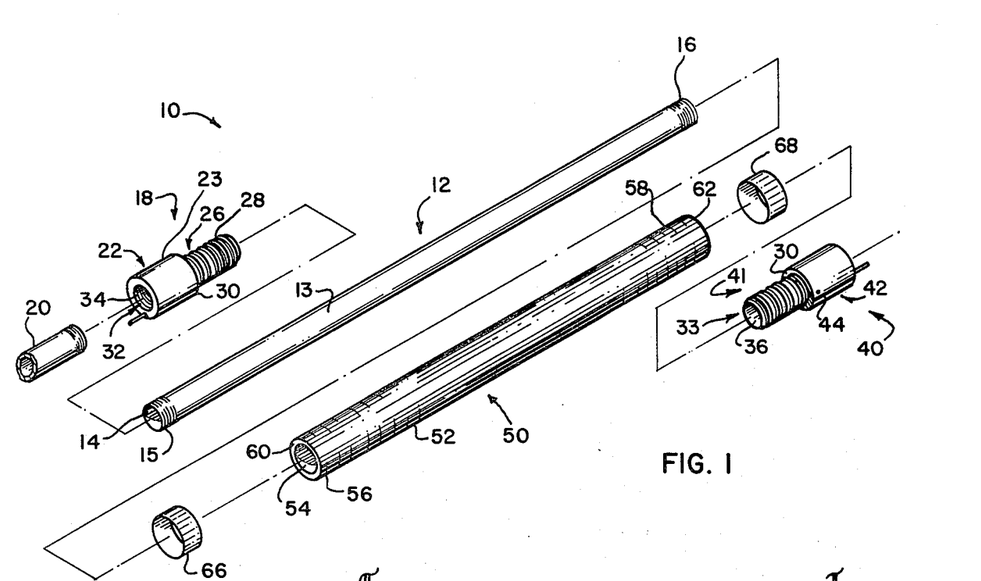
FIG. 1 is an exploded perspective view of a packer apparatus.
Figures 6, 7, 8:
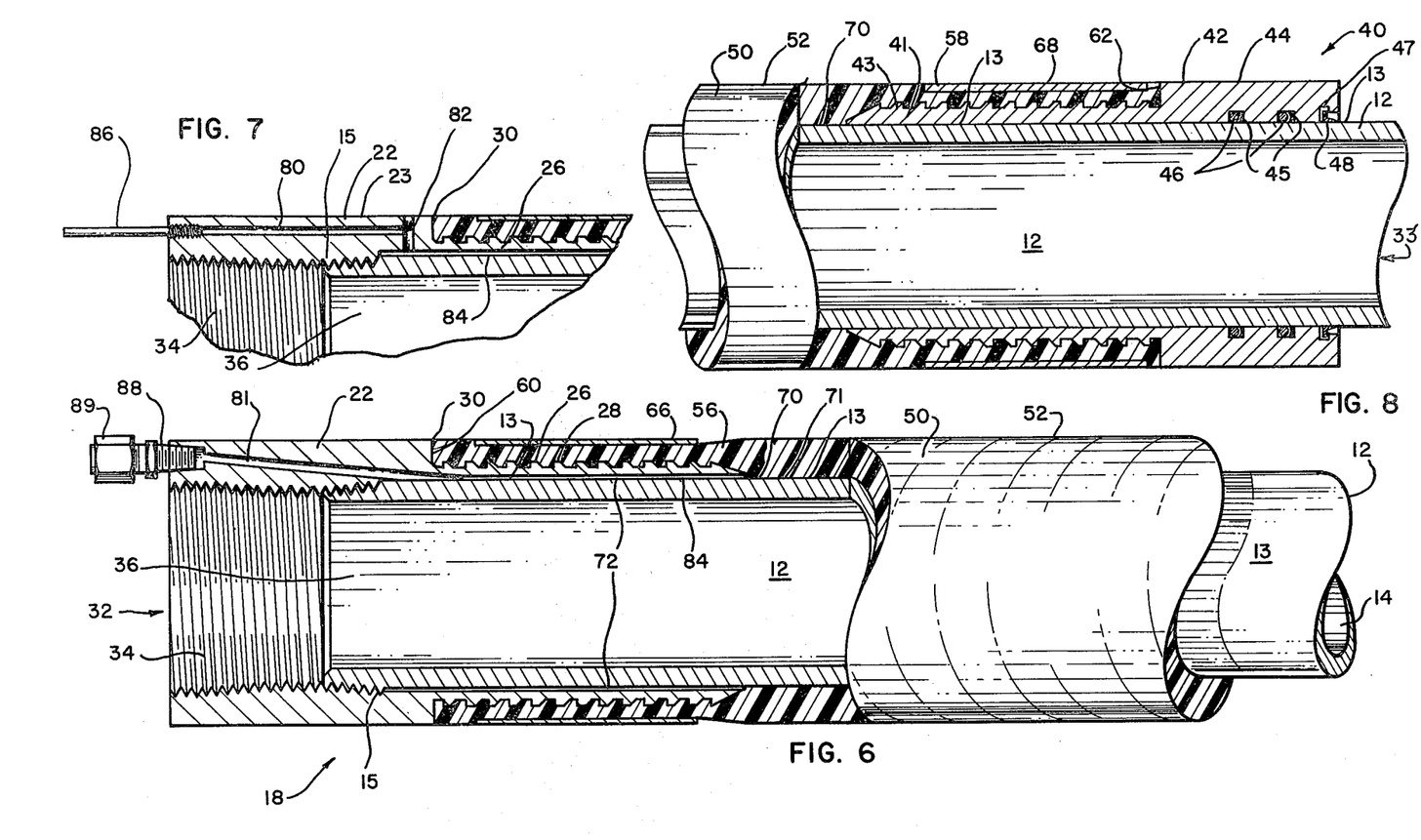
FIG. 6 is a cross-sectional detailed view of one end of a packer of the type illustrated in FIG. 1.
FIG. 7 is a detailed cross-sectional view of a portion of a packer head.
FIG. 8 is a detailed cross-sectional view of a sliding end packer head.
Figure 9:
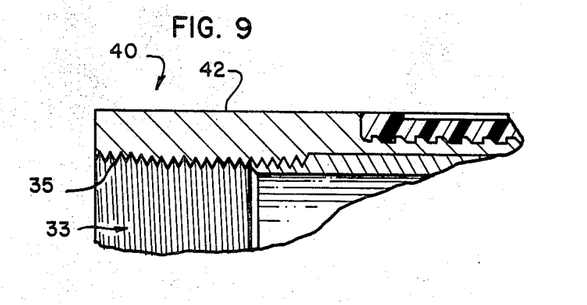
FIG. 9 is a detailed cross-sectional view of a portion of a packer head.
Figures 10, 11, 12, 13:
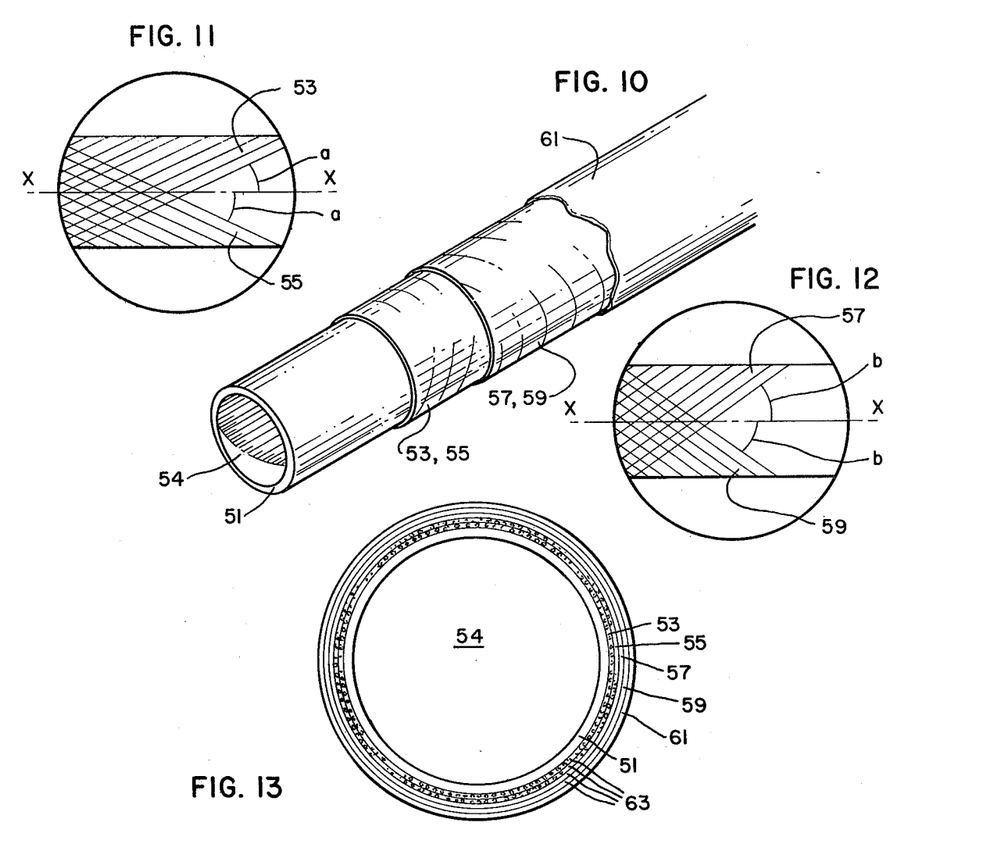
FIG. 10 is a cut-a-way prospective view of a packer gland.
FIG. 11 is detailed plan view of a portion of a packer gland.
FIG. 12 is a detailed planned view of another portion of a packer gland.
FIG. 13 is a cross-sectional end view of a packer gland.

As illustrated generally by FIG. 1, the packer apparatus comprises an inner tubular means 12 having a cylindrical outer surface 13 and a cylindrical elongate passage 14 extending therethrough. Tubular means 12 is constructed from a high strength structurally rigid member such as standard pipe or the like and in one embodiment comprises a threaded end portion 15, 16 at either end thereof. A first head means 18 which allows coupling of the inner tubular means 12 to associated structure, such as pipe 20, has a longitudinally extending body portion 22 with a generally cylindrical outer surface 23. A longitudinally sleeve portion 26 is integrally formed or otherwise rigidly attached to the body portion 22 and comprises a cylindrical outer surface 28 which intersects an annular axially facing abutment surface 30 of the body portion 22. A central elongate cylindrical passage 32 extends longitudinally through the first head means 18 and comprises a threaded passage portion 34 adjoining a smooth passage portion 36 as illustrated in FIG. 6. The threaded passage portion 34 is positioned generally within the body portion 22 and the smooth passage portion 36 is positioned generally within the sleeve portion 26 extending a short distance beneath the body portion 22. As illustrated by FIG. 8, a second head means 40, positioned at the opposite end of inner tubular means 12, FIG. 1, has the same general exterior construction as the first head means 18 having a sleeve portion and a body portion 41, 42 with a cylindrical sleeve outer surface 43 and cylindrical body outer surface 44. A longitudinally extending central cylindrical passage 33 passes from end to end of the second head means 42 and may comprise various attachment means for sealingly attaching the second head means 42 to the intertubular means 12. As illustrated in FIG. 8, the attachment means may comprise O-rings 46 positioned in parallel O-ring annular grooves 45. The O-rings 46 provide sealing engagement with the outer surface 13 of intertubular means 12. As illustrated by FIG. 8, a wiping means such as annular wiping ring 48 may be provided in an annular wiping groove 47 and head portion 44 for the purpose of wipingly cleaning the outer surface 13 of tubular member 12 as the head 40 slides back and forth thereon. In another embodiment of the second head means 40 as illustrated in FIG. 9, the inner passage 33 comprises a threaded portion 35 positioned within body portion 42 which is matingly connected to threaded portion 16 of inner tubular member 12. The second head slideable attachment means shown in the embodiment of FIG. 8 is used in association with a slideable end packer and the second head means fixed attachment means which is illustrated in the embodiment of FIG. 9 is used in association with a fixed end packer as described in further detail hereinafter. As shown by FIG. 1, a cylindrical gland means 50 having a cylindrical outer surface 52 and cylindrical passage means 54 extending from end to end thereof may be constructed in a series of layers as illustrated by FIGS. 10-13. In the embodiment illustrated in FIGS. 10-13 the gland member comprises an inner bladder element 51 constructed from a resilient material such as rubber or the like which is inflatably and deflatably extendable and substantially fluid impermeable. The bladder element 51 serves the purpose of retaining a fluid therein as discussed in further detail hereinafter while the outer layers 53–61 function to prevent rupture of the inner bladder 51. As illustrated by FIG. 11, a second layer is formed by means of a tape like wrapping material 53 which is wound about the bladder 51 at an acute angle "a" with respect to the longitudinal axis XX of the gland 50. A second layer formed by wrapping material 55 is reverse wound with respect to the first layer 53 by positioning it at angle "a" with respect to the longitudinal axis XX but in the reverse direction from the first material 53. The cross wrapping of layers 53, 55 allows the gland 50 to expand in a radial direction while shortening in a longitudinal direction by a shifting relationship between the wrap layers 53, 55. Thus the material used in wraps 53, 55 need not be longitudinally extensionable about its own axis and may comprise a reinforced wrapping material such as aramid or steel reinforced belting having longitudinal wire members 63 passing therethrough as illustrated in FIG. 13. The packer may be additionally reinforced by further layers of wrapping (not shown) positioned at substantially the same angle "a". The additional wraps enable the packer to withstand rupture either from a roughened surface into which it comes in contact or from the internal pressure within the gland itself. The packer inflation characteristics may be varied by wraps 57, 59 positioned at acute angle "b" with respect to longitudinal axis XX and extending only a few inches inward from the gland ends 56, 58. By changing the wrap angle "b", and length of the wraps, the inflation contour of the packer may be varied to achieve a predetermined shape as required for various conditions. In one preferred embodiment, the first two wraps 53, 55 are provided at an angle "a" of substantially 25 degrees and the second pair of short length wraps 57, 59 are provided at an angle "b" of substantially 35 degrees.

As illustrated by FIG. 6 and FIG. 8, the end portions 56, 58 of the gland 50 are sealingly mounted to the outer cylindrical surface 28, 43 of sleeve portions 26, 41 respectively by sealing band means 66, 68. The sealing band means 66, 68 may be of in a conventional type which apply radially inwardly directed compressive force against the gland end 56, 58 and sleeves 26, 41. As illustrated by FIG. 6, a gas chamber means 70 is defined by the inner cylindrical surface 72 of gland 50 and outer cylindrical surface 13 of inner tubular means 12. During a deflated condition, as illustrated generally by FIGS. 6, 2 and 4, the surfaces 71, 13 may be in touching contact but as air or other fluid fills the chamber 70, it expands as illustrated generally by FIGS. 3 and 5 pressing the outer surface 52 of the gland 50 against the wall of the surrounding hole 100 as illustrated generally in FIGS. 16–18.

Figures 14, 19:
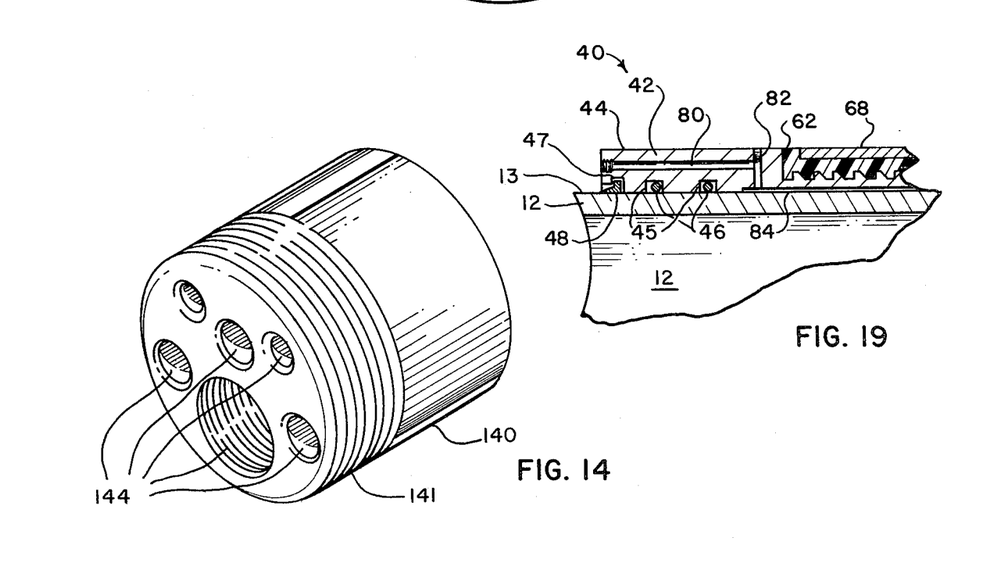
FIG. 14 is a perspective view of a packer adapter plug.
FIG. 19 is a detail cross sectional view of a portion of a packer head.

Fluid is provided to the inner chamber 70 by means of an air passage represented generally by axially extending bore 80, radially extending bore 82 and annular passageway 84 in FIG. 7 and 19 and by axially extending radially inclined bore 81 and annular passage 84 illustrated in FIG. 6. The annular passageway 84 is defined by the inner surface 72 of sleeve 26 and the outer surface 13 of inner tubular member 12. In one preferred embodiment the dimension of the annular passageway 84 is approximately 0.010 inches. The portion of the passageway 84 intersecting the outer surface of body member 22 may be connected to air conduit as by screw and nipple means 88 and 89 mounted at the end surface of body portion 22 illustrated generally in FIG. 6. Alternately, a fluid conduit 86 may be rigidly mounted within the bore 80 as illustrated in FIG. 7 and connected to an air line 110 as by conventional coupling means 89, FIG. 3.

Figure 2:
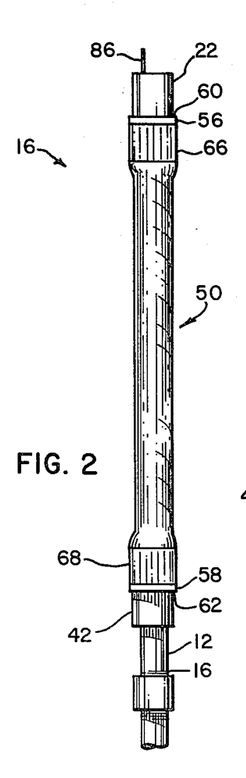
FIG. 2 is a plan view of a moveable end packer in a deflated condition.
Figure 3:
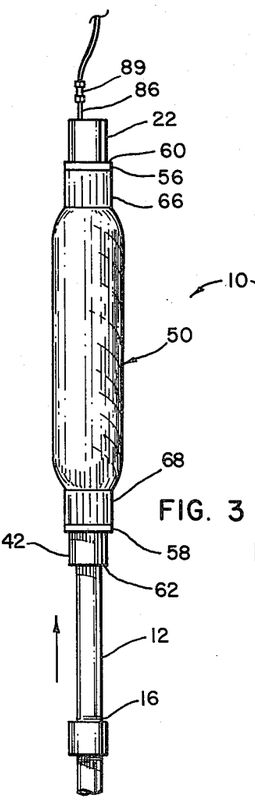
FIG. 3 is a plan view of a moveable end packer in an inflated condition.
Figures 4, 5:
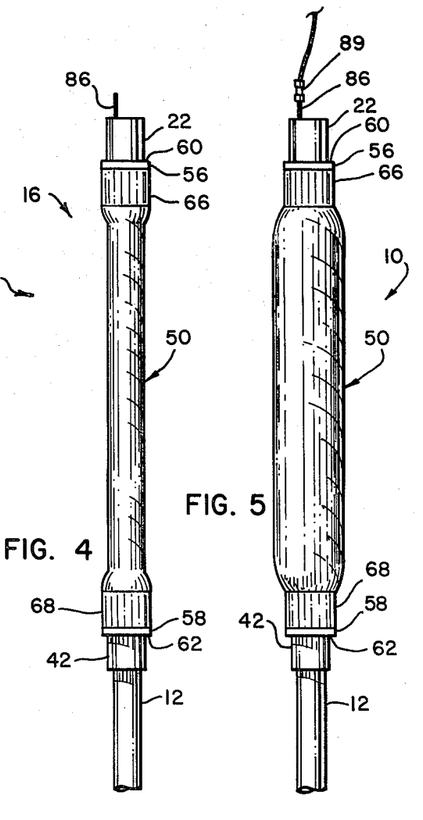
FIG. 4 is a plan view of a fixed end packer in a deflated condition.
FIG. 5 is a plan view of a fixed end packer in an inflated condition.
Figure 18:
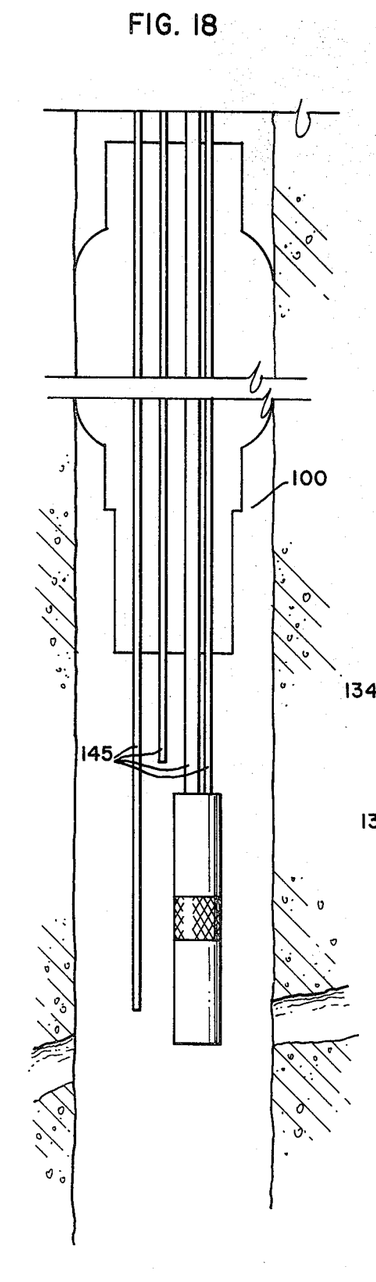
FIG. 18 is a schematic drawing showing the use of multiple instruments in a portion of the drill hole isolated by two packers.

As illustrated in FIGS. 2 and 3, the packer may be constructed with one moveable end such as the type shown in FIG. 8 and 18 whereby a reinforced bladder 50 of the type illustrated in FIGS. 10–13 may be provided to prevent rupture of the internal bladder element 51. As illustrated in FIGS. 4 and 5, a packer 10 with two fixed heads 18, 40, such as illustrated in FIGS. 6 and 9, may also be used for various design and application considerations.

Figure 15:
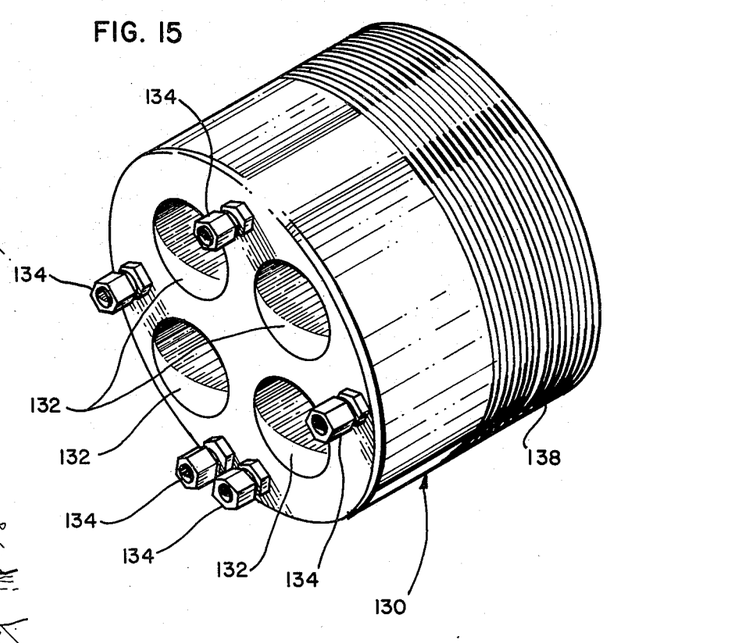
FIG. 15 is a perspective view of another embodiment of a packer adapter plug.
Figures 16, 17:
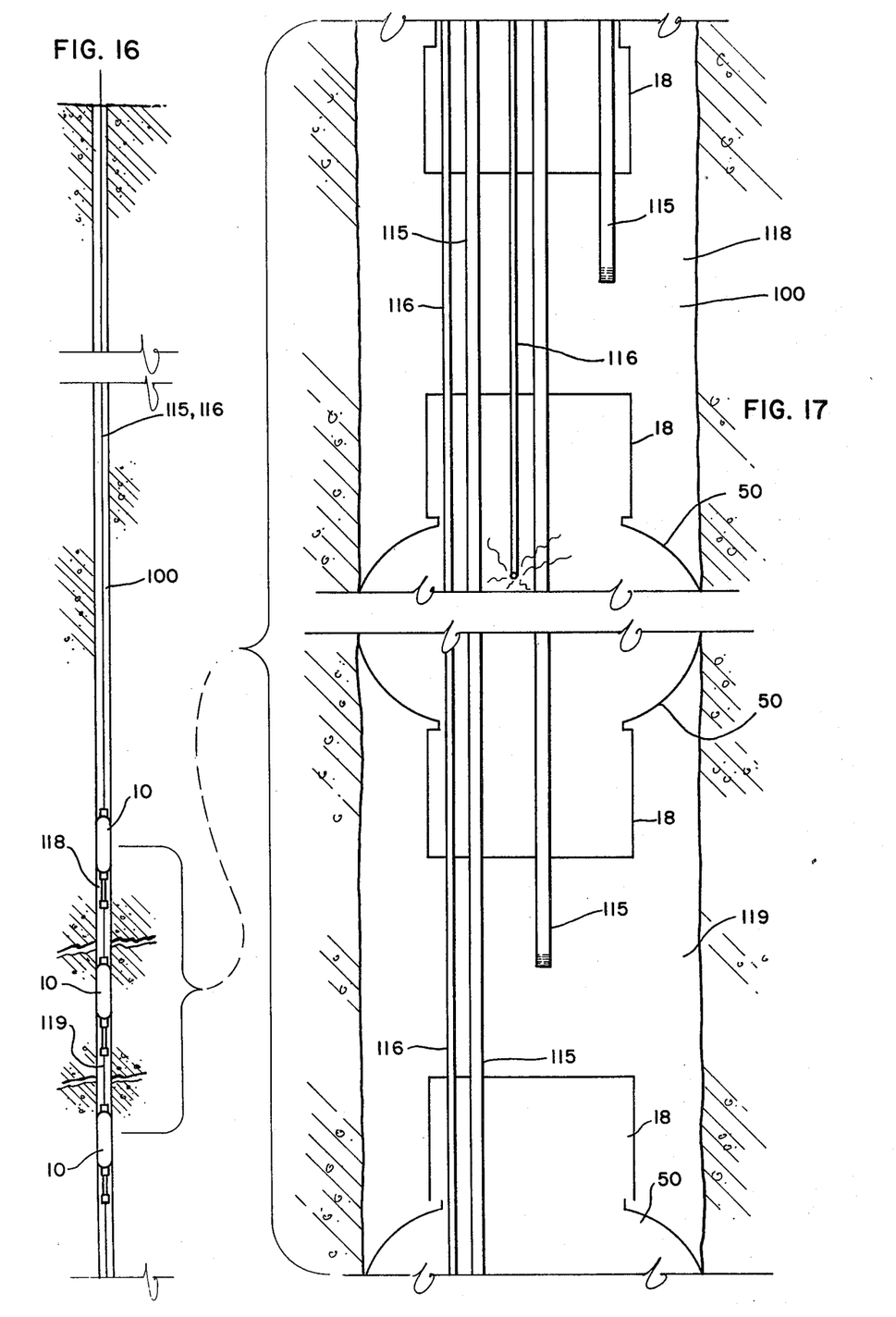
FIG. 16 is a schematic drawing showing the use of packers to isolate various zones within a borehole for water sampling.
FIG. 17 is another schematic drawing showing detail from a portion of FIG. 16.

As illustrated in FIGS. 16 and 17, the present packer apparatus 10 allows multiple conduit 115 and multiple air line conduit 116 to be passed through the interior thereof for purposes such as for example sampling water quality at various zones 118, 119 within a bore hole 100. The basic packer apparatus 10 illustrated in FIGS. 1–9 may be adapted for such use by employing a multiple conduit adapter head cap 130 as illustrated in FIG. 15. The adapter 130 may be threaded 138 to allow connection to head 18 and may comprise a plurality of transverse bores 32 therethrough to accommodate conduit 115 having substantially similar outer diameters to that of the inner diameters of the bores 132. Air supply passages 134 for providing air or other fluid to expand the bladder 50 of each packer 10 through air line conduit 116 may be provided in the adapter 130. Each adapter bore 134 may be provided with sealing means such as O-rings or the like (not shown) or threading attachment means (not shown) to sealingly secure the conduit passing therethrough as required by a specific application.

In a slightly different embodiment as illustrated by FIG. 18, a single packer may be provided with a threaded adapter head cap 140, FIG. 14, having external threaded portion 141 and inner threaded conduit bores 144 positioned therein for securing conduits 145 used for various functions such as pump effluent passage, electrical wire and the like. Various other adapters may of course be used depending upon the use of the packer apparatus 10 are and within the scope of the invention.

It is contemplated that the inventive concepts herein described may be variously otherwise embodied and it is intended that the appended claims be construed to include alternative embodiments of the invention except insofar as limited by the prior art.

What is claimed is:
1. Packer apparatus for packing off a portion of an elongated surrounding hole comprising:
an inner elongated tubular means having a cylindrical outer surface and a cylindrical elongated passage of relatively large diameter for enabling flow of fluids therethrough or placement of various structural members therein, said inner tubular means having a first threaded end portion with external threads on said cylindrical outer surface;
a first head means threadably mounted on said threaded end portion of said inner tubular means for connecting said apparatus to other associated structure and for attaching a gland means to said inner tubular means and having a body portion with a cylindrical outer surface of substantially larger diameter than said cylindrical outer surface of said inner pipe means, a sleeve portion extending axially from said body portion with a generally cylindrical outer surface of lesser diameter than said cylindrical outer surface of said body portion and of greater diameter than said cylindrical outer surface of said inner tubular means, a central elongated passage extending through said body portion and said sleeve portion of said first head means and comprising a threaded passage portion and a smooth passage portion,
said threaded passage portion in said central elongated passage in said first head means being located in said body portion and being threadably engaged with said first threaded end portion of said inner tubular means, and said smooth passage portion of said central elongated passage being located substantially in said sleeve portion and mounted circumjacent said cylindrical outer surface of said inner tubular means axially adjacent said threaded end portion of said inner tubular means;
a second head means mounted on said inner tubular means axially adjacent the end of said inner tubular means distel said first threaded end portion for connecting said inner tubular means to an elongated expandable and contractable cylindrical gland means and having a body portion with a cylindrical outer surface of substantially larger diameter than said cylindrical outer surface of said inner tubular means and having a sleeve portion extending axially from said body portion with a generally cylindrical outer surface of lesser diameter than said cylindrical outer surface of said body portion of said second head means and of greater diameter than said inner tubular means, and having a central elongate passage means extending through said second head means;
an elongated expandable and contractable cylindrical gland means comprising resilient material mounted circumjacent said inner tubular means for expansion under pressure into engagement with a portion of the surrounding hole and having a cylindrical outer surface of relatively large diameter approximately equal to the diameter of said cylindrical outer surfaces of said body portions of said coupling means, a cylindrical passage extending therethrough with a diameter approximately equal to the diameter of said outer cylindrical surface of said inner tubular means, opposite end portions mounted circumjacent said sleeve portions of said first and second head means in compressive sealing engagement therewith; band means mounted in compressive engagement with and circumjacent each end portion of said elongated expandable and contractable gland means in axial alignment with said sleeve portions of said head means for holding said end portions of said gland means in fixed axial relationship to said head means and for causing compressive sealing engagement therebetween;
expansion chamber means located between and defined by said outer cylindrical surface of said inner tubular means and an inner cylindrical surface of said gland means for receiving a quantity of fluid under pressure to cause expansion of said gland means;
expansion fluid passage means in fluid communication with said expansion chamber means and sealed relative said inner tubular means cavity for supply- ing fluid under pressure to said expansion chamber means, said expansion fluid passage means comprising an annular fluid passage portion between said sleeve portion on said first head means and said outer cylindrical surface on said inner tubular means.

2. The invention of claim 1 wherein said tubular means comprises a second threaded end portion, wherein said second head means is operably mounted on said second threaded end portion of said tubular means.

3. The invention of claim 2 said second head means being of the same size, shape and construction as said first head means.

4. The invention of claim 1 wherein said sleeve portion of said first and second head means comprise raised griping means on the outer surface thereof for ensuring sealing gripping contact with said gland means.

5. The invention of claim 1 wherein a portion of said second head means central elongate passage means is in sliding sealing engagement with said outer cylindrical surface of said inner tubular means.

6. The invention of claim 5 wherein said second head means comprises O-ring means in said central elongate passage means for sealingly slidingly engaging said outer cylindrical surface of said inner tubular means.

7. The invention of claim 6 wherein said second head means further comprises wiping means operably mounted within said central elongate passage means axially outward said O-ring means for wipingly cleaning said outer surface of said inner tubular means.

8. The invention of claim 1 wherein said expansion fluid passage means comprises a bore portion passing between an outer surface of said body portion of said first head means and said annular fluid passage portion, said annular fluid passage portion extending beneath a section of said body portion of said first head means.

9. The invention of claim 8 wherein said bore portion of said expansion fluid passage means comprises a first generally axially extending bore passing through the outer end surface of said body portion and a second generally radially extending bore intersecting said first bore and said annular fluid passage portion.

10. The invention of claim 8 wherein said bore portion comprises a substantially axially extending, radially inwardly inclined bore.

11. The invention of claim 1 wherein said gland means comprises:
a first layer comprising a resiliently expansionable inner bladder means for sealingly retaining fluid therein;
a second layer encompassing said first layer comprising a first overlapping wrap means said first wrap means positioned at a first acute angle relative the longitudinal axis of said gland means; and
a third layer encompassing said second layer comprising a second wrap means said second wrap means being reverse wrapped relative said first wrap means at the same acute angle relative said longitudinal axis as said first wrap means; said first wrap means and said second wrap means comprising a reinforced substantially nonexpandable material.

12. A reinforced gland device for an inflatable packer, said gland device being of a generally cylindrical shape and sealingly mounted at either end to a packer head device and comprising:
a first layer comprising a resiliently expansionable inner bladder means for sealingly retaining fluid therein;
a second layer encompassing said first layer comprising a first overlapping wrap means said first wrap means positioned at a first acute angle relative the longitudinal axis of said gland means; and
a third layer encompassing said second layer comprising a second wrap means said second wrap means being reverse wrapped relative said first wrap means at acute angle relative said longitudinal axis
said first wrap means and said second wrap means comprising a reinforced substantially nonexpandable material;
said second layer and said third layer being substantially axially coextensive with said first layer whereby said first layer is shielded from puncturing contact with sharp objects in portions of a bore hole in which the packer is mounted;
a fourth layer encompassing end portions of said third layer comprising a third wrap means wrapped at a second acute angle relative said longitudinal axis;
a fifth layer encompassing said fourth layer comprising a fourth wrap means reverse wrapped relative said third wrap means at said second acute angle relative said longitudinal axis;
said third wrap means and said fourth wrap means comprising a reinforced substantially nonexpandable material;
said third and fourth wrap means providing increased radial resistance to expansion at said end portion for providing a predetermined expanded configuration to said gland member.

13. The invention of claim 12 wherein said first acute angle in less than 26° and said second acute angle is less than 36°.

14. A reinforced gland for an inflatable packer said gland device being of a generally tubular construction and sealingly attached at a first end to a fixed packer head device and sealingly attached at a second end to a moveable packer head device comprising:
a resiliently expansionable inner bladder means for sealingly retaining fluid therein;
a first set of reinforcing wrap means for wrappingly shieldingly encompassing said inner bladder means and being substantially coextensive therewith said first set of reinforcing wrap means being constructed of a substantially nonexpansionable material;
a second set of reinforcing wrap means provided in encompassing relationship with end portions of said first set of reinforcing wrap means for reinforcing said end portions of said gland for providing a relatively smooth expansion profile from end to end thereof.

15. Packer apparatus for packing off a portion of an elongate surrounding hole comprising:
an inner elongate tubular means having a first end and a second end and having an elongate cavity extending longitudinally therethrough;
a first head means for attaching said packer apparatus to a conduit extending into the hole operably mounted on said first end of said elongate tubular means and having an axially outwardly positioned tubular body portion mounted in sealed annular relationship with an exterior surface portion of said inner elongate tubular means, an having an axially inwardly positioned sleeve portion integrally formed with said body portion and encompassing an exterior surface portion of said inner tubular means in radially spaced apart relationship therewith whereby an annular sleeve enclosure is defined by said encompassed exterior surface portion of said inner tubular member and said encompassing sleeve portion;

an elongate expandable and contractable cylindrical gland means for expansion under pressure into engagement with a portion of the surrounding hole, said gland member being mounted in annular enclosing relationship with said inner tubular means and fixedly attached at a first end thereof in annular sealed relationship with an exterior surface of said first head means sleeve portion, and having a second end mounted in sealed relationship relative said inner tubular means; and fluid passage means for and expansion chamber defined by an inner surface of said gland means and an outer surface of said inner tubular means enclosed by said gland means, said expansion chamber being in fluid communication with said annular sleeve enclosure;

expansion fluid passage means in fluid communication with said expansion chamber means and sealed relative said inner tubular means cavity for supplying fluid under pressure to said expansion chamber means for inflating said gland comprising expansion fluid conduit means for transmitting expansion fluid to said first head means and bore means in said body portion of said first head means in fluid communication with said expansion fluid conduit means and said annular sleeve enclosure.

16. The invention of claim 15 said expansion fluid conduit means being positioned exterior of said inner tubular means tubular cavity.

17. The invention of claim 16 further comprising first head insert means matingly insertable into said first head tubular body portion for accepting a first set of conduit in axial bore portion thereof.

18. The invention of claim 17 further comprising a second head insert means removeably interchangeable with said first head insert means for supporting a second set of conduit in axial bore portions thereof, said second head insert bore configuration being different from said first head insert bore configuration.

19. The invention of claim 17 wherein said first head insert comprises a plate threadingly mateable with said first head insert.

20. The invention of claim 1 wherein said second head comprises second head inflation fluid passage means for passing inflation fluid to a second packer apparatus.

21. The invention of claim 20 wherein said second head is of identical construction to said first head.

* * * * *